Figure 1:
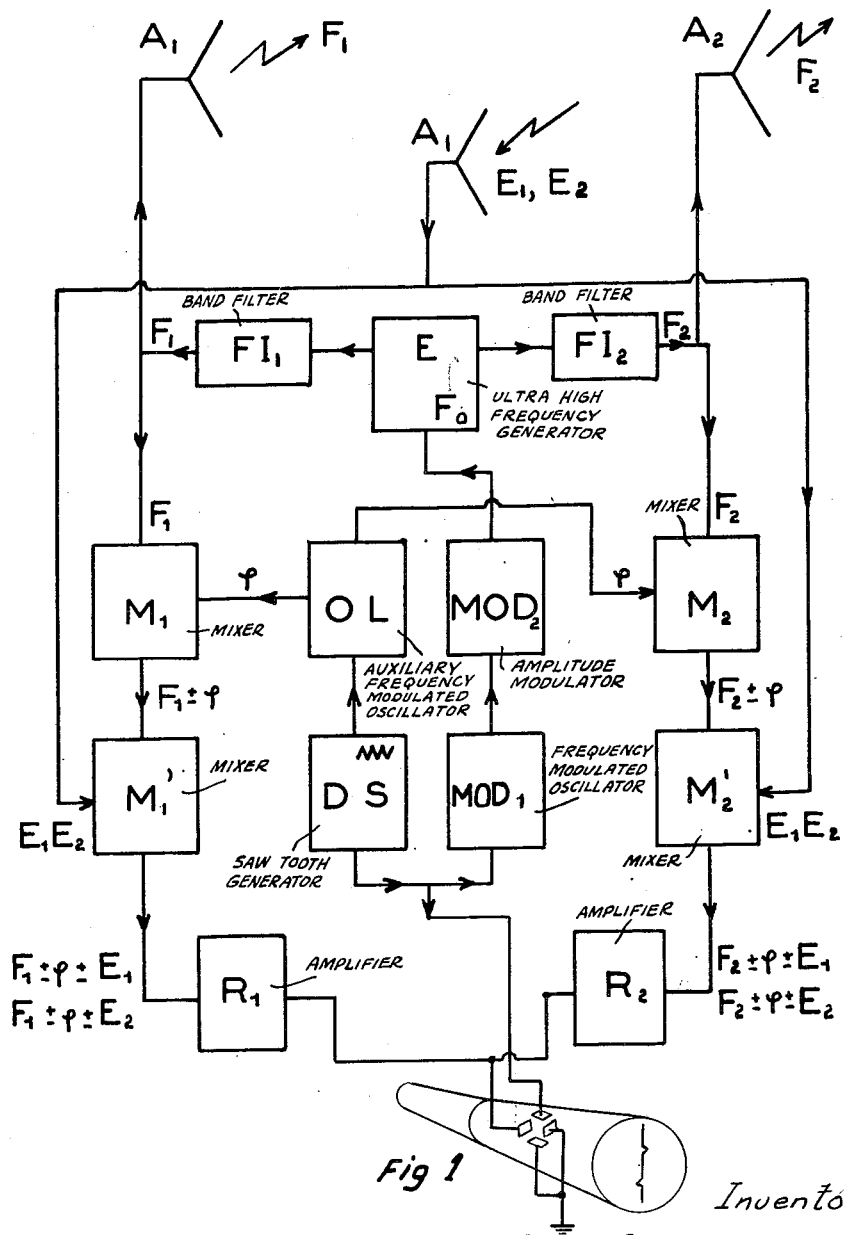

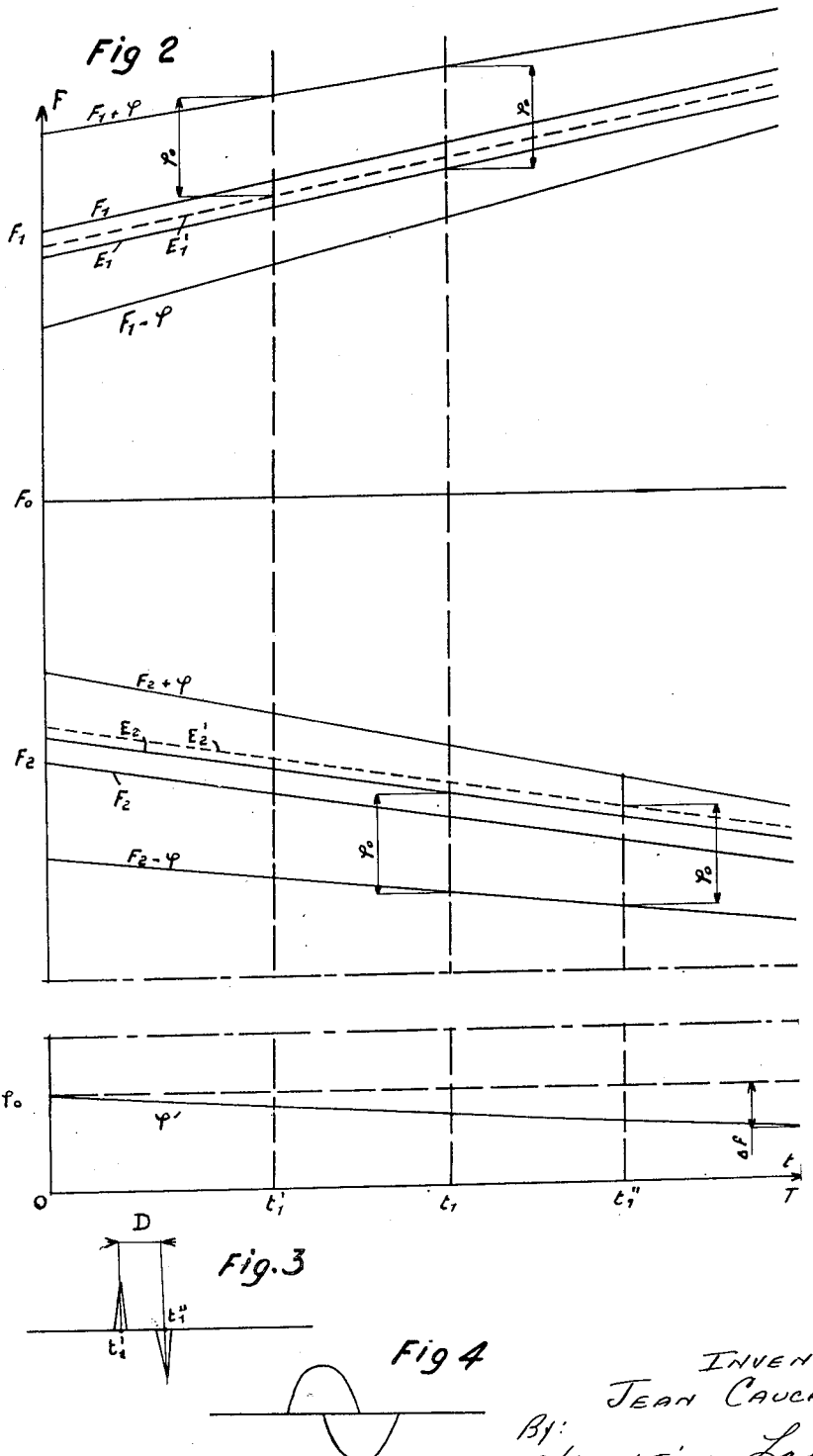

United States Patent Office 2,695,995
Patented Nov. 30, 1954

2,695,995

RADAR WITH COMBINED AMPLITUDE AND FREQUENCY MODULATION TO ELIMINATE THE ECHOES FROM THE STATIONARY OBJECTS

Jean Cauchois, Paris, France, assignor to Compagnie Generale de Telegraphie Sans Fil, a corporation of France Application December 12, 1951, Serial No. 261,343

Claims priority, application France December 26, 1950

1 Claim. (Cl. 343—9)

The present invention refers to continuous emission radars, in which the emitted waves, frequency modulated, are mixed with the echoes due to the reflection of these waves on the targets to detect, the distance of the latter being determined by the frequency of the beats obtained.

It is a known fact, that, with the usual radars, it is very difficult to distinguish between the stationary targets (hills, buildings, etc.) and moving targets (aircraft, ships, etc.).

The object of the invention is an improvement to the mentioned radars, aiming to suppress the inconvenience pointed out by means of an appropriated device, automatically eliminating the echoes from the stationary objects and only keeping those from the moving targets.

According to the invention, the improved radar emits waves subjected to a combined amplitude and frequency modulation, so as to produce the equivalent of a virtual unit composed of two elementary frequency modulated transmitters, in which the frequency of one increases while the frequency of the other decreases during a period of common recurrence, starting from two initial different frequencies.

Two receivers are so arranged as to directly receive the waves respectively emitted by one or the other of both elementary transmitters, and to mix them with the echoes received from the targets to be detected. The frequencies of the beats so obtained in both receivers are equal at each time when stationary targets are concerned. Indeed, let at a given instant, the emitted frequencies be $F_1$ and $F_2$ ($F_1$ increasing frequency, $F_2$ decreasing frequency), the corresponding frequencies of the echo from a fixed object are $E_1$ and $E_2$ such as $F_1-E_1=E_2-F_2=\Delta E$. On the contrary, for moving targets, gaining on the transmitter, the frequencies due to the echo increase and become respectively $E'_1=E_1+fd$ and $E'_2=E_2+fd$, $fd$ being the variation in apparent frequency due to the Doppler-Fizeau's effect. Then, the beat frequencies are $F_1-E'_1=E-fd$ and $E'_2-F_2=E+fd$, that is, two values different one from another of the quantity $2fd$. In the case of targets going away from the transmitter, the frequencies of the echo will be $E_1''=E_1-fd$, $E_2''=E_2-fd$ and both beats will be $F_1-E_1''=E+fd$ and $E_2''-F_2=E-fd$, still differing of the same quantity $2fd$, this being proportional to the speed of the moving target. Therefore, the radar so embodied allows to select the moving obstacles and to measure their speed.

The invention will be better understood with the help of the enclosed drawings in which:

The Figure 1 schematically, gives a nonlimiting example of embodiment of it.

The Figure 2 is a graph used to explain the working of the whole of Figure 1, and The Figures 3 and 4 show marks obtained on the screen of a cathodic ray tube.

The radar represented on the Figure 1, as a non-limiting example of embodiment of the invention, includes an ultra-high frequency transmitter E, sinusoidally amplitude modulated by modulator MOD₂ supplying a signal which itself is linearly modulated in frequency by modulator MOD₁ with a recurrence period T, though other modulation laws be not excluded.

The instantaneous voltage $e$ produced at the output of E is then in the form:

$$e = A(1+m \sin \Omega t) \cos \omega t \text{ with } \Omega = \Omega_0 + at$$

or $$e = A[1+m \sin (\Omega_0 + at)t] \cos \omega t \quad (1)$$

$A$, $m$, $\Omega_0$, $a$ being constants, and $\omega$ being the pulsation corresponding to the carrier frequency $$F_0 = \frac{\omega}{2\pi}$$

The equation may be written:

$$e = A[\cos \omega t + m \cos \omega t \sin (\Omega_0 + at)t] =$$
$$= A\left\{\cos \omega t + \frac{m}{2}[\sin (\omega+\Omega_0+at)t - \sin (\omega-\Omega_0-at)t]\right\}$$

showing that, in addition to the frequency carrier $$F_0 = \frac{\omega}{2\pi}$$

the emitted signal includes two side frequencies, at every instant symmetrical with regard to $F_0$.

$$F_1 = \frac{\omega + \Omega_0 + at}{2\pi} = F_0 + \frac{\Omega_0 + at}{2\pi}$$

and $$F_2 = \frac{\omega - \Omega_0 - at}{2\pi} = F_0 - \frac{\Omega_0 + at}{2\pi}$$

and linearly varying in function of time, in opposite directions.

Two filters Fl₁ and Fl₂, only allowing the bands $F_1$ and $F_2$ respectively to pass through, and eliminating the carrier $F_0$, feeding two directive aerials A₁ and A₂.

Two identical receivers R₁ and R₂, their input circuits being tuned up on a same frequency $\varphi_0$, are so arranged as to transform signals whose frequencies are equal or close to $\varphi_0$, into vertical deviations, on the screen of a cathodic ray tube TRC, the outputs of both receivers being connected in opposition so that the said deviations have opposite directions on the screen.

A wobbled local oscillator OL produces oscillations whose frequency $\varphi$ is linearly frequency modulated in function of the time, with the same recurrence period T as the transmitter. The initial frequency of $\varphi$, at the instant $t=0$, is made equal to the input frequency of the receivers $\varphi_0$, and its terminal value corresponding to the cycle end ($t=T$) $\varphi_0-\Delta f$; the shifting $\Delta f$ being chosen weak before $\varphi_0$.

The oscillations of frequency $\varphi$ are mixed, on one side in the mixer M₁ with the frequency $F_1$, and on the other side, in the mixer M₂ with the frequency $F_2$. The beats $F_1 \pm \varphi$ and $F_2 \pm \varphi$, issued from these mixings, are carried over respectively toward the mixers M'₁ and M'₂.

The signals received by the receiving antenna Ar which are the waves reflected by the targets, are also carried over toward the mixers M'₁ and M'₂. Let E₁ and E₂ be the frequencies of a given echo, respectively due to the emitted waves $F_1$ and $F_2$, the beats obtained are $(F_1 \pm \varphi) \pm E_1$ and $(F_1 \pm \varphi) \pm E_2$ at the output of the mixer M₁ and $(F_2 \pm \varphi) \pm E_1$ and $(F_2 \pm \varphi) \pm E_2$ at the output of M'₂.

The receivers R₁ and R₂ to which these sequences of beats are applied, let pass through but those among the whole, whose frequency is equal or close to the value $\varphi_0$ on which they are tuned up. Now, it is easy to show that only $F_1+\varphi$ can beat with E₁ for giving $\varphi_0$ at the input of the receiver R₁ as well as only $F_2-\varphi$ interfering with E₂ would give $\varphi_0$ at the input of R₂.

This result is also seen out of the graphs of Figure 2. On this figure, the axis of the X represents the time $t$ and the axis of the Y, the frequencies. The carrier and the two side frequencies are respectively represented by the straight lines $F_0$, $F_1$ and $F_2$. The frequencies received by the receiving aerial Ar from a determined echo supposed to be stationary, are figured by the straight lines E₁ and E₂. The local oscillator frequency is given by the straight line $\varphi$ whose value at the instant $t=0$ is $\varphi_0$ and at the instant $t=T$ is $\varphi_0-\Delta f$ ($\Delta f$ has been strongly exaggerated for the clearness of the graph).

It is seen that a beat of frequency $\varphi_0$ will be produced between the signals $F_1+\varphi$ and E₁ at the moment $t_1$ as it is only at this instant that the distance between the corresponding straight lines is equal to $\varphi_0$. Likewise, a beat $\varphi_0$ is produced at the same instant by the interference of $E_2$ and $F_2-\varphi$.

Both beats, respectively applied to receivers $R_1$ and $R_2$ produce two simultaneous signals of equal intensity at the output of these receivers. These signals, at their turn, are applied in opposition to the vertical plates of the cathodic ray tubes TRC whose horizontal plates receive a saw-tooth voltage which may be supplied by the same source DS which at the same time controls the local oscillator OL and the modulator $MOD_1$ as indicated on the diagram of Figure 1. In these conditions no remains appear on the screen, as long as the two signals cancel each other, that is, every time that echoes from stationary targets are concerned.

It is no more so when the detected objects are moving. Owing to the Doppler's effect, the straight lines $E_1$ and $E_2$ move upwards of a quantity $f_d$ (increase of apparent frequency) when the moving body comes nearer to the transmitter, or downwards (decrease of apparent frequency) when the moving body goes away from it.

In the case of the figure, corresponding to an increase in frequency, the straight lines $E_1$ and $E_2$ are respectively replaced by the straight lines $E'_1$ and $E'_2$. The beats of frequency $\varphi_0$ are no more simultaneous in both receivers; they are produced at the instant $t'_1$ previous to $t_1$ for the first receiver, and at the instant $t''_1$ subsequent to $t_1$ for the second one, the interval $t'_1 t''_1$ being a function of the Doppler's effect, which itself is proportional to the apparent speed of the moving body with regard to the transmitter.

Therefore, on the screen of the cathode ray tube, two separate deviations are obtained for the same moving body. With receivers whose band-pass is narrow, both deviations are clearly separated by an interval D as indicated for example in Figure 3, the actual position of the moving target being in the middle of that interval. On the contrary, with a relatively wide band-pass, the signals take a form as in Figure 4, and then, in order to discriminate them, it is advisable to use a phase discriminator.

In any case, the echoes from the stationary targets are eliminated, and the echoes of the moving targets alone remain on the screen, the apparent speed of the latter being possibly deduced from the relative interval between both spots produced. As it is well understood, the invention is not limited to the described example, and can give issue to numerous variances of embodiments. The single transmitter can be replaced by two separate transmitters; a single antenna can be subtsituted to both separated aerials; the modulation laws used can be modified, etc.

What I claim is:

A radar of the frequency modulated type with elimination of fixed echoes comprising an ultra-high frequency generator, a first source of modulation signals connected to the said generator for periodically amplitude-modulating the output of said generator, a second source of modulation signals connected to the said first source for frequency-modulating the output of said first source, whereby the said generator supplies two frequency-modulated side-bands and one carrier wave; the frequencies of one of said frequency modulated side-bands increasing while the frequencies of the other side-band decreases during a common period of recurrence, means for separating the said two frequency-modulated side-bands and eliminating the carrier wave, means for radiating each of said frequency-modulated side-bands, an auxiliary frequency-modulated oscillator, means for receiving reflected signals corresponding to the frequency-modulated side-bands after reflection by objects to be detected, two sets of mixing means, each one mixing the oscillations of the said auxiliary oscillator with one of the said radiated frequency-modulated side-bands and the said reflected signals, two band pass amplifying means respectively receiving the beats produced by the said sets of mixing means, and indicating means connected to said amplifying means, said indicating means producing an indication which is a function of the distance and of the speed of mobile objects to be detected.

No references cited.